United States Patent
Mehta et al.

(10) Patent No.: US 9,619,164 B2
(45) Date of Patent: Apr. 11, 2017

(54) CLUSTER SOLID STATE DRIVES

(71) Applicant: Nimble Storage, Inc., San Jose, CA (US)

(72) Inventors: Varun Mehta, Los Altos Hills, CA (US); Tom McKnight, San Jose, CA (US)

(73) Assignee: NIMBLE STORAGE, INC., San Jose, CA (US)

( * ) Notice: Subject to any disclaimer, the term of this patent is extended or adjusted under 35 U.S.C. 154(b) by 42 days.

(21) Appl. No.: 14/639,937

(22) Filed: Mar. 5, 2015

(65) Prior Publication Data

US 2015/0324124 A1 Nov. 12, 2015

Related U.S. Application Data

(60) Provisional application No. 61/989,452, filed on May 6, 2014.

(51) Int. Cl.
*G06F 12/00* (2006.01)
*G06F 3/06* (2006.01)

(52) U.S. Cl.
CPC ............ *G06F 3/0626* (2013.01); *G06F 3/061* (2013.01); *G06F 3/0655* (2013.01); *G06F 3/0658* (2013.01); *G06F 3/0688* (2013.01)

(58) Field of Classification Search
CPC .................................. G06F 1/187; G06F 1/18
USPC .................................................. 711/105, 103
See application file for complete search history.

(56) References Cited

U.S. PATENT DOCUMENTS

| | | | | |
|---|---|---|---|---|
| 7,517,231 | B2 * | 4/2009 | Hiew | H05K 9/0067 439/76.1 |
| 8,064,205 | B2 * | 11/2011 | Farhan | G06F 1/185 361/737 |
| 8,370,570 | B2 * | 2/2013 | Motonaga | G06F 3/0613 711/114 |
| 2006/0136644 | A1 | 6/2006 | Martin et al. | |
| 2009/0273896 | A1 * | 11/2009 | Walker | G06F 1/187 361/679.33 |
| 2010/0281199 | A1 * | 11/2010 | Fu | G06F 13/409 710/300 |

(Continued)

FOREIGN PATENT DOCUMENTS

| | | | | |
|---|---|---|---|---|
| GB | 201410468 | * | 7/2014 | G06F 1/187 |
| GB | 2527105 A | * | 12/2015 | G06F 1/187 |

OTHER PUBLICATIONS

Siewert, Sam et al., "Solid State Drive Applications in Storage and Embedded Systems", Intel Technology Journal, vol. 13, Issue 1, 2009, pp. 29-53.*

(Continued)

*Primary Examiner* — Pierre-Michel Bataille
(74) *Attorney, Agent, or Firm* — Ascenda Law Group, PC

(57) ABSTRACT

Described herein are techniques for arranging a plurality of M.2 solid state drive (SSD) modules and flash storage elements into a compact form factor. On a first side of an SSD sled, a plurality of M.2 SSD modules may be communicatively coupled to a port expander. On a second side of the SSD sled, a plurality of flash storage elements (not packaged into M.2 SSD modules) may be present. A plurality of SSD sleds (with the above-described characteristics) may be sized so as to collectively fit into a single hard disk drive (HDD) compatible compartment of a chassis.

9 Claims, 5 Drawing Sheets

(56) References Cited

U.S. PATENT DOCUMENTS

| | | | | |
|---|---|---|---|---|
| 2013/0100733 | A1* | 4/2013 | Sato | G11C 11/1675 365/173 |
| 2015/0324124 | A1* | 11/2015 | Mehta | G06F 3/0626 711/103 |
| 2015/0362965 | A1* | 12/2015 | Davis | G06F 1/187 361/679.33 |

OTHER PUBLICATIONS

Feng Chen et al, "Hystor: Making the Best Use of Solid State Drives in High Performance Storage Systems", Proceedings of the International Conference on Supercomputing, May 31-Jun. 4, 2011.*
Michael Cornwell, "Anatomy of a Solid-State Drive Magazine", Communications of the ACM, vol. 55, Issue 12, Dec. 2012, pp. 59-63.*
Nikolaus Jeremic, "The Pitfalls of Deploying Solid-State Drive RAIDs" Proceedings of the 4th Annual International Conference on Systems and Storage, May 30-Jun. 1, 2011.*
"2.5" M2 (NGFF) SSD drive", Addonics.com, Addonics Technologies, Inc. (1998-2015), downloaded Dec. 3, 2014, from: http://www.addonics.com/products/ad25m2ssd.php, 2 pgs.
"Hyper Express", ASUS.com, ASUSTeK Computer Inc. (2008), downloaded Dec. 4, 2014, from: http://www.asus.com/Motherboards/Hyper_Express/specifications/, 2 pgs.
"Lian Li Announces a Tall, Slim EATX Chassis with Three Internal Compartments—PCX2000FN", Lian-Li.com, News (Sep. 4, 2012), downloaded Mar. 6, 2015, from: http://www.lian-li.com/en/lian-li-announces-a-tall-slim-eatx-chassis-with-three-internal-compartments-pc-x2000fn/, 3 pgs.
"LSI First to Ship New High-Performance 12Gb/s SAS Products", LSI.com, Newsroom (Mar. 5, 2013), downloaded Dec. 4, 2014, from: http://www.lsi.com/company/newsroom/pages/20130305pr.aspx, 1 pg.
"M.2 Next Generation Form Factor: M.2 (NGFF) Connector" TE Connectivity (2014), Quick Reference Guide, 8 pgs.
"M.2 NGFF SSD to 2.5in SATA Adapter Converter", StarTech.com (1985-2015), downloaded Dec. 3, 2014, from: http://www.startech.com/HDD/Adapters/M-2-NGFF-SSD-to-2-5in-SATA-Adapter~SAT32M225, 3 pgs.
"M2 PCIe SSD—PCIe 3.0 4-Lane adapter", Addonics.com, Addonics Technologies, Inc. (1998-2015), downloaded Dec. 4, 2014, from: http://www.addonics.com/products/adm2px4.php, 2pgs.
"M2PS Dual M.2 (NGFF) SSD to SATA Adapter", HWTools.net, Bplus Technology Corporation (2009-2013), downloaded Dec. 3, 2014, from: http://www.hwtools.net/Adapter/M2PS.html, 5 pgs.
"PM8053 SXP 24x12G 24 port 12G SAS expander", PMCS.com, PMC-Sierra, Inc. (1996-2014), downloaded Dec. 4, 2014, from: http://pmcs.com/products/storage/sas_expanders/pm8053/, 2 pgs.
"Port expander", Wikipedia.org (last modified Oct. 20, 2014), downloaded Dec. 4, 2014, from: http://en.wikipedia.org/wiki/Port_expander, 2 pgs.
"Port multiplier", Wikipedia.org (last modified Sep. 14, 2014), downloaded Dec. 4, 2014, from: http://en.wikipedia.org/wiki/Port_multiplier, 3 pgs.
"SATA—M2 SSD adapter", Addonics.com, Addonics Technologies, Inc. (1998-2015), downloaded Dec. 4, 2014, from: http://http://www.addonics.com/products/adm2sahdd.php, 2pgs.
"The world's first 10Gbit/s SATA Express device!", ASUS.com, ASUSTeK Computer Inc. (2008), downloaded Dec. 4, 2014, from: http://www.asus.com/Motherboards/Hyper_Express/, 3 pgs.
Ngo, "Migrating to SSD: Get yourself a new computer without getting one" CNet.com (Mar. 13, 2012), downloaded Dec. 4, 2014, from: http://www.cnet.com/how-to/migrating-to-ssd-get-yourself-a-new-computer-without-getting-one/, 16 pgs.
Singh, "ASUS unveils Hyper Express SATA Express drive with insane performance", DigitalStormOnline.com (Apr. 26, 2014), downloaded Dec. 3, 2014, from: http://www.digitalstormonline.com/unlocked/asus-unveils-hyper-express-sata-express-drive-with-insane-performance-idnum238/, 4 pgs.
Tokar, "M.2 NGFF PCIe SSD Adapter Overview—Birds Eye View of Our M.2 NGFF SSD Test Hardware", The SSD Review (Nov. 26, 2013), downloaded Dec. 3, 2014, from: http://www.thessdreview.com/daily-news/latest-buzz/m-2-ngff-pcie-ssd-adapter-overview-birds-eye-view-m-2-ngff-ssd-test-hardware/, 7 pgs.
"M.2 SATA SSD x 4 to SATA III x 4 Port Adapter with 3.5 Inch Metal Frame", Micro SATA Cables, downloaded Dec. 3, 2014 from: http://www.microsatacables.com/m-2-sata-ssd-x-4-to-sata-iii-x-4-port-adapter-with-3-5-inch-metal-frame, 3 pgs.
"NGFF M.2 SSD to SATA Adapter with Case", Micro SATA Cables, downloaded Dec. 3, 2014, from: http://www.microsatacables.com/ngff-m-2-ssd-to-sata-adapter-with-case, 2 pgs.
"M.2 x 2 to SATA III Dual Port Adapter with 3.5 Inch Metal Frame", Micro SATA Cables, downloaded Dec. 3, 2014, from: http://www.microsatacables.com/m-2-x-2-to-sata-iii-dual-port-adapter-with-3-5-inch-metal-frame, 3 pgs.

* cited by examiner

CLUSTER SOLID STATE DRIVES

RELATED APPLICATIONS

This application is a non-provisional patent application of and claims priority to U.S. Provisional Application No. 61/989,452, filed 6 May 2014, which is assigned to the assignee of the present invention and is incorporated by reference herein.

FIELD OF THE INVENTION

The present invention relates to methods for arranging a plurality of solid state drives (SSDs) into a compact form factor, and storage systems in which a plurality of SSDs are arranged into a compact form factor.

BACKGROUND

Most commercially available storage systems generally include those with disk drives (e.g., hard disk drives (HDDs)), those with solid state drives (SSDs) (e.g., flash drives), and those with a combination of the two. Disk drives have the advantage of being lower cost than SSDs. On the other hand, it is typically faster to read data from an SSD than a disk drive. With the advancement of semiconductor technology, SSDs are becoming cheaper to manufacture. Accordingly, in storage systems with a combination of disk drives and SSDs, it is becoming increasingly advantageous to store a larger percentage of data using SSDs. A challenge is how to design a cost effective storage system in which a larger percentage of data is stored using SSDs.

SUMMARY OF THE INVENTION

In one embodiment, disk drives and SSDs are arranged into a commercially available (i.e., off the shelf) chassis. A focus of one embodiment is how to arrange (and electrically interconnect) the maximum number (or a large number) of SSDs into a compact form factor, the form factor dictated by one or more slots of the commercially available chassis. The slot could be a 3.5-inch slot formerly configured to house an HDD.

In one embodiment of the invention, SSDs that adhere to the M.2 standard, formerly known as the Next Generation Form Factor (NGFF), may be employed, while in other embodiments, SSDs that adhere to other standards could also be employed.

DETAILED DESCRIPTION OF THE INVENTION

Figure 1:
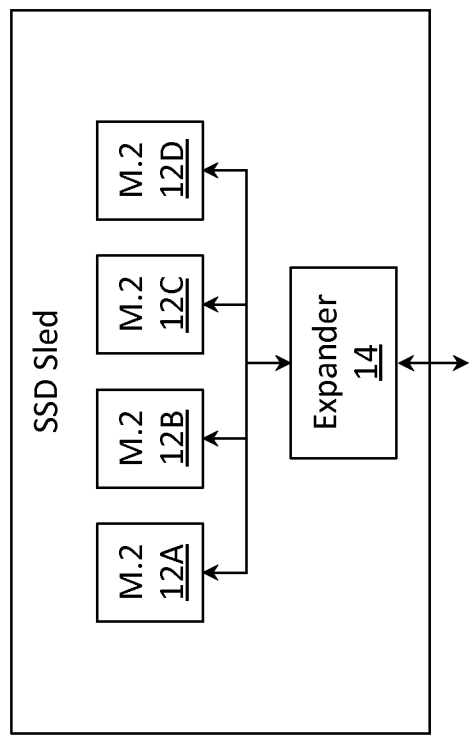
FIG. 1 depicts an SSD sled with a plurality of M.2 SSD modules, in accordance with one embodiment.

FIG. 1 depicts SSD sled 10A with a plurality of M.2 SSD modules (12A, 12B, 12C, 12D), in accordance with one embodiment. As depicted in FIG. 1, the plurality of M.2 SSD modules (12A, 12B, 12C, 12D) may be communicatively coupled to port expander 14, which compactly arranges the input/output (I/O) signals of all of the M.2 SSD modules onto a set of I/O ports. Port expander 14, however, is just one mechanism to compactly arrange the I/O signals, and in another embodiment, port expander 14 may be replaced with a non-volatile memory express (NVMe) peripheral component interconnect express (PCIe) interface. While SSD sled 10A may contain four M.2 SSD modules in the embodiment depicted in FIG. 1, SSD sled 10A may contain a different number of M.2 SSD modules in other embodiments. See, e.g., the embodiment in FIGS. 3-4 with five M.2 SSD modules (described below).

Figure 2:
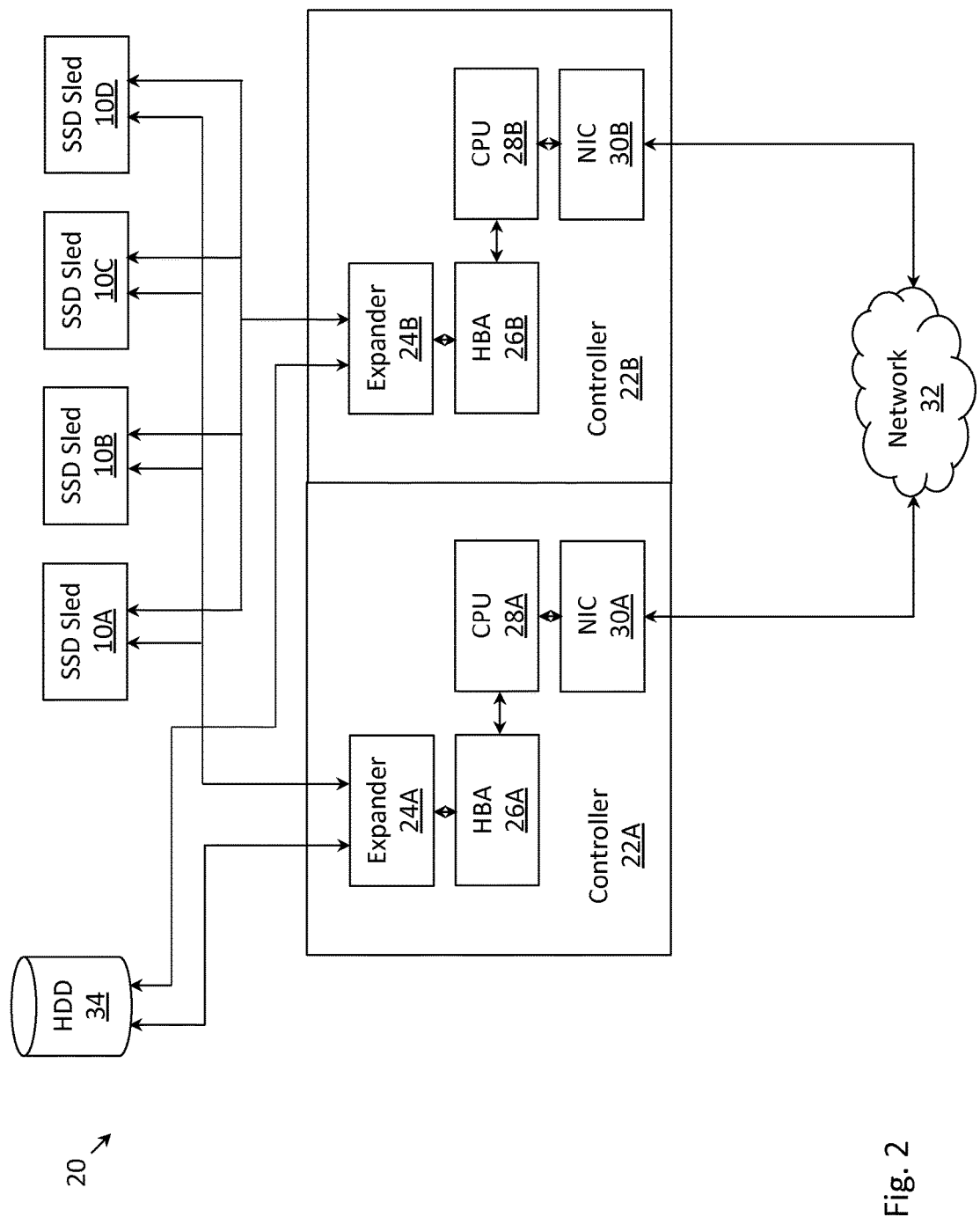
FIG. 2 depicts a storage system, in accordance with one embodiment.

FIG. 2 depicts storage system 20, in accordance with one embodiment. As depicted in FIG. 2, a plurality of SSD sleds (10A, 10B, 10C, 10D), each having M.2 SSD modules, may be communicatively coupled to one or more controllers. For extra reliability, the embodiment depicted in FIG. 2 includes two controllers (22A, 22B). In the event that one of the controllers fails, the other controller can take over the operation of the failed controller. Each of the SSD sleds (10A, 10B, 10C, 10D) may be more specifically communicatively coupled to a port expander (24A, 24B) of each controller. In other embodiments, it is possible to use only a single controller.

Focusing on controller 22A for ease of explanation, central processing unit (CPU) 28A of controller 22A may be communicatively coupled to port expander 24A of controller 22A via host bus adaptor (HBA) 26A. As is known in the art, data storage and retrieval tasks may be delegated from the CPU to the HBA, freeing up the CPU for other tasks. CPU 28A may additionally be communicatively coupled to network 32 (e.g., Internet, LAN, WAN, MAN, public network, private network, etc.) via network interface controller (NIC) 30A. A similar description may apply to controller 22B.

Storage system 20 may also contain one or more disk drives, such as hard disk drive (HDD) 34 depicted in FIG. 2. One or more disk drives may be communicatively coupled to each controller via the port expander of each controller.

Figure 3:
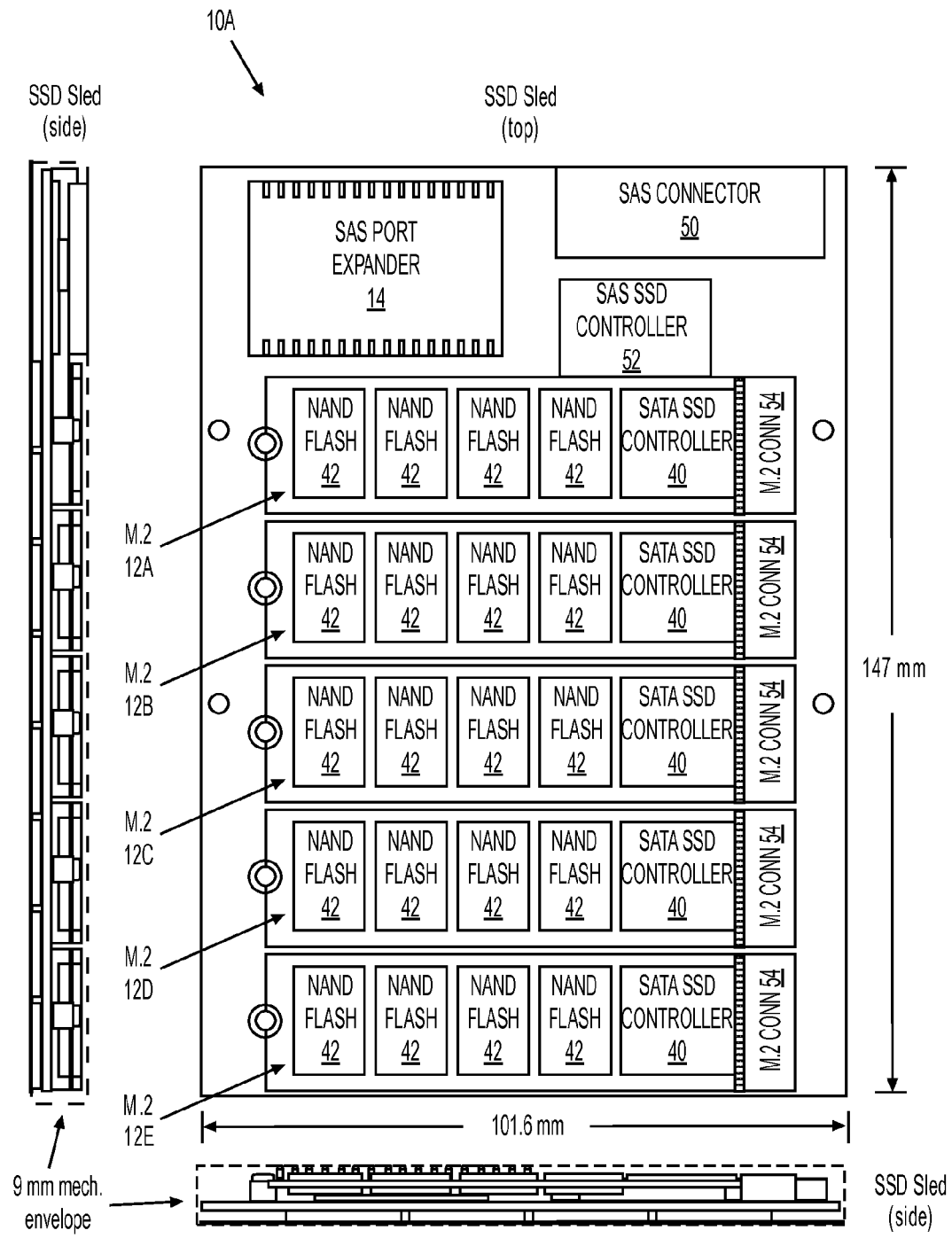
FIG. 3 depicts different views (e.g., top, side views) of one embodiment of an SSD sled with M.2 SSD modules.

FIG. 3 depicts different views (e.g., top and side views) of one embodiment of SSD sled 10A with five M.2 SSD modules (12A, 12B, 12C, 12D, 12E). Each of the M.2 SSD modules (12A, 12B, 12C, 12D, 12E) may contain one SATA SSD controller 40 and four NAND flash chips 42, each flash chip measuring 12×18×1.5 mm. SSD sled 10A may have dimensions of 101.6 mm wide, 147 mm long and 9 mm high. Each of the M.2 SSD modules (12A, 12B, 12C, 12D, 12E) may be an 80 mm SATA module.

Figure 4A:
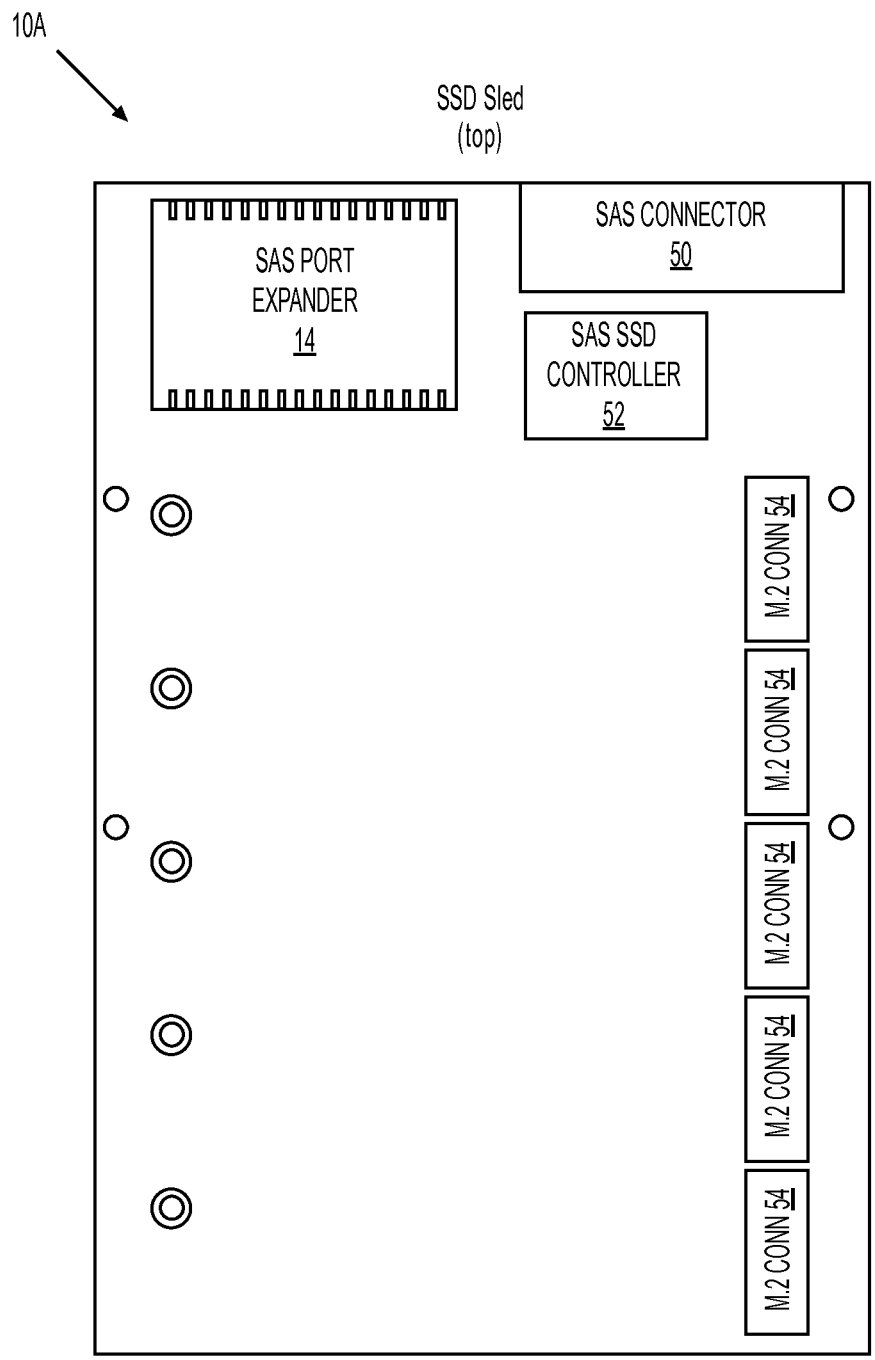
FIGS. 4A-4B provide further depictions (e.g., top view, bottom view) of one embodiment of an SSD sled with M.2 SSD modules.
Figure 4B:
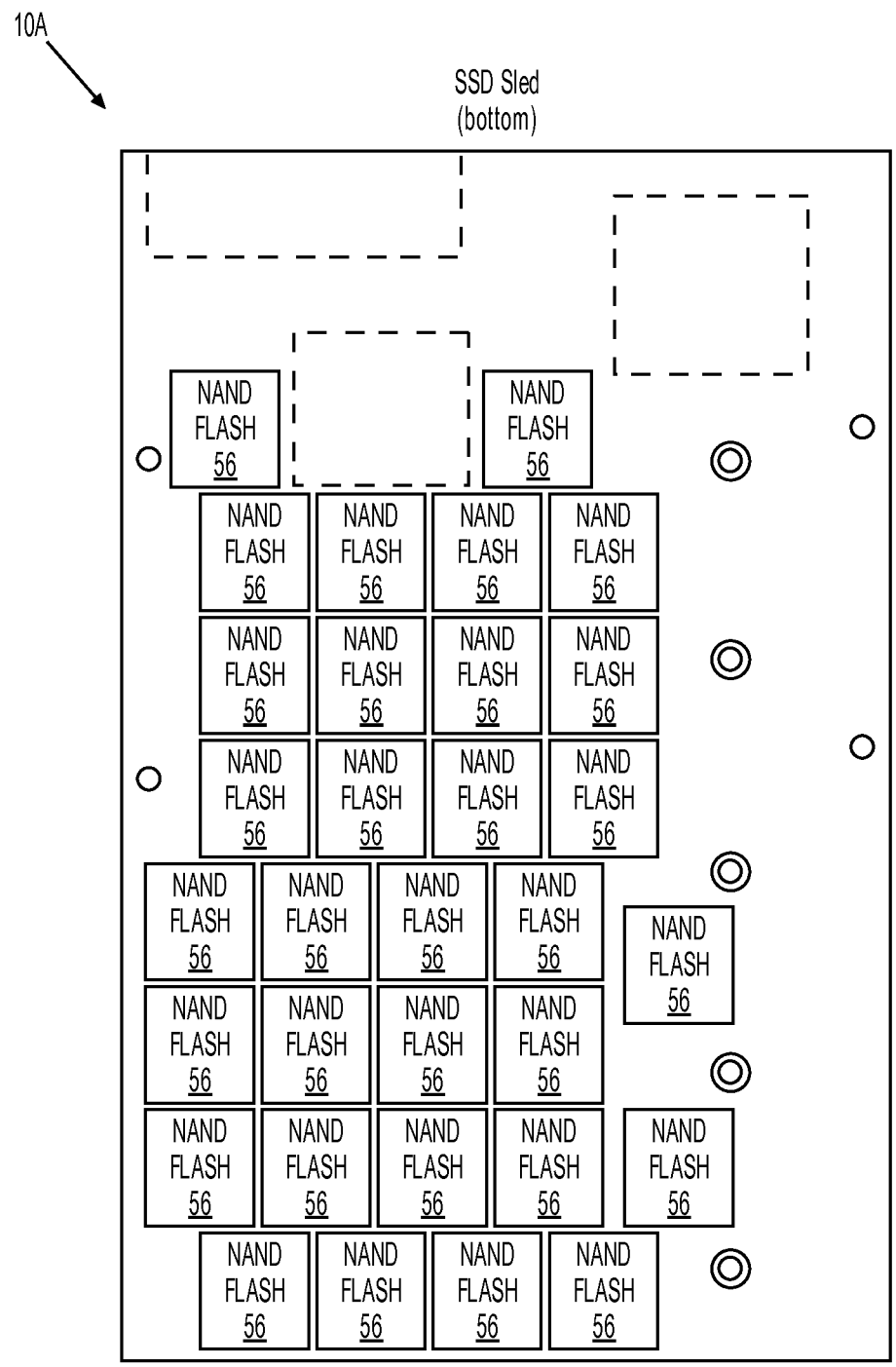

FIGS. 4A-4B provide further depictions (e.g., top and bottom views) of one embodiment of SSD sled 10A with M.2 SSD modules. In FIG. 4A, the top view of SSD sled 10A is depicted without the M.2 modules to better illustrate the other components of SSD sled 10A. As illustrated, SSD sled 10A may contain SAS (serial attached small computer system interface) port expander 14 (e.g., PMCS 8053 24 Port SAS Expander with heat sink). Also as illustrated, SSD sled 10A may contain SAS connector 50 for electrical connection to an SAS bus (not depicted). Also as illustrated, SSD sled 10A may contain SAS SSD controller 52 (e.g., a PM8304 2×12G SAS SSD Controller). Each M.2 SSD module (not depicted in FIG. 4A) may be communicatively coupled to SSD sled 10A by an M.2 connector 54 (e.g., a 4.2 mm tall M.2 connector).

In FIG. 4B, the bottom view of SSD sled 10A is depicted. Additional flash chips 56 may be present (i.e., embedded) on the bottom side of SSD sled 10A, such flash chips being additional to those on the M.2 SSD modules (12A, 12B,

12C, 12D, 12E). Such embedded SSDs, which could be an SAS or SATA SSD, may support 4 TB of additional capacity. One example SAS SSD is the PMCS 8304 SAS SSD.

In one embodiment, a base SSD sled configuration may support up to 5 TB, the configuration being formed by up to 5 double-sided M.2 modules (e.g., 1 TB per module). The total supported capacity of an SSD sled may be 8.5 TB instead of 9 TB, since the fifth M.2 module slot may be restricted to a single-sided M.2 module when (a large number of) embedded SSDs are populated on the bottom side of the SSD sled.

In one embodiment, SSD sled 10A may conform to the basic dimensional footprint of a 3.5-inch HDD, thus being capable of replacing a 3.5-inch HDD in an existing chassis slot or other receptacle.

It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A storage system, comprising:
   a plurality of solid state drive (SSD) sleds, wherein each of the SSD sleds includes:
   (i) a plurality of M.2-compliant SSDs, each of the M.2-compliant SSDs comprising a serial advanced technology attachment (SATA) SSD controller and a plurality of NAND flash chips,
   (ii) a port expander of the SSD sled, each of the M.2-compliant SSDs being communicatively coupled to the port expander of the SSD sled, and
   (iii) a plurality of flash storage elements, each of the flash storage elements comprising a NAND flash chip,
   wherein the plurality of SSD sleds is sized so as to collectively fit into a single hard disk drive (HDD) compatible compartment of a chassis,
   wherein the M.2-compliant SSDs are arranged on a first surface of the SSD sleds and the flash storage elements are arranged on a second surface of the SSD sleds, and
   wherein the first surface faces a first direction and the second surface faces a second direction opposite to the first direction.

2. The storage system of claim 1, further comprising a port expander of a controller device, each respective port expander of each of the SSD sleds being communicatively coupled to the port expander of the controller device.

3. The storage system of claim 1, wherein the HDD compatible compartment of the chassis comprises a 3.5-inch drive bay.

4. The storage system of claim 2, wherein the port expander of the controller device is communicatively coupled to a central processing unit (CPU) of the controller device via a host bus adaptor (HBA) of the controller device.

5. The storage system of claim 2, further comprising a plurality of HDDs, wherein the plurality of HDDs are communicatively coupled to the controller device via the port expander of the controller device.

6. The storage system of claim 1, wherein the port expander of the SSD sled is a serial attached small computer system interface (SAS) port expander.

7. The storage system of claim 1, wherein each of the SSD sleds further includes a serial attached small computer system interface (SAS) connector, and wherein the SAS connectors connects the SSD sleds to an SAS bus.

8. The storage system of claim 1, wherein each of the SSD sleds further includes a serial attached small computer system interface (SAS) SSD controller.

9. The storage system of claim 1, wherein the plurality of SSD sleds replaces a 3.5-inch HDD.

* * * * *